UNITED STATES PATENT OFFICE.

CALEB G. COLLINS, OF WOODMERE, NEW YORK, ASSIGNOR TO CALVIN AMORY STEVENS, OF NEW YORK, N. Y.

PROCESS OF RENDERING METALLIC SULFIDS SOLUBLE.

SPECIFICATION forming part of Letters Patent No. 702,047, dated June 10, 1902.

Application filed August 26, 1901. Serial No. 73,252. (No specimens.)

*To all whom it may concern:*

Be it known that I, CALEB G. COLLINS, a citizen of the United States, residing at Woodmere, Nassau county, State of New York, have invented certain new and useful Improvements in Processes of Rendering Sulfid Ores Soluble, of which the following is a specification sufficient to enable others skilled in the art to which the invention appertains to make and use the same.

My invention relates, specifically, to the extraction of copper and other metals from sulfid ores, the object being to afford a cheaper, more rapid, and effective process of rendering metallic sulfids soluble than has heretofore been attained by the treatment of the crushed ore with oxygen while immersed in ammonia solution.

The invention consists, essentially, in treating the crushed sulfid ore, simply moistened with aqueous ammonia and not submerged therein, to an excess of oxygen, whereby the oxygen is brought into intimate contact with every particle of the moistened ore and the chemical reactions are accelerated and rendered complete, substantially as herein set forth.

A distinguishing feature of my process is that the crushed ore when exposed to the action of the oxygen is simply dampened with the aqueous ammonia instead of being immersed therein. For instance, if a pyritous ore containing copper is powdered and then immersed in aqueous ammonia all the minute spaces between the particles of comminuted ore are filled with the ammonia solution, under which condition but little copper can be dissolved, the solvent action of the ammonia ceasing long before the point of saturation is attained because of lack of oxygen. If air under pressure be pumped into the immersed mass of ore, the solvent action of the ammonia on the copper sulfid is increased; but since the air in such a mixture is in bubbles, which tend constantly to escape, and since each particle of ore is covered by a protecting film of liquid the results attained in extraction of the metal are altogether too small to be valuable in a commercial sense in proportion to the cost, trouble, and time involved. If, however, the powdered sulfid ore be drenched with a solution of ammonia and then the surplus solution be drained off, so as to draw air into the minute spaces between the particles of damp ore, the oxygen of the air and the ammonia present act with great energy and rapidity on the metallic sulfids, resulting in the production of the soluble thiosulfate of ammonia and copper, $(NH_4)2S_2O_3, CuS_2O_3$, or possibly the reaction may proceed as follows:

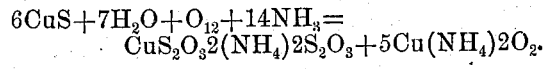

$$6CuS + 7H_2O + O_{12} + 14NH_3 = CuS_2O_3 2(NH_4)2S_2O_3 + 5Cu(NH_4)2O_2.$$

If, however, the oxygen and aqueous ammonia act on the copper sulfid at a low temperature, a mixture of ammonia dithionate and ammonium cuprate may be produced, thus—

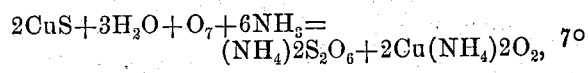

$$2CuS + 3H_2O + O_7 + 6NH_3 = (NH_4)2S_2O_6 + 2Cu(NH_4)2O_2,$$

together with perhaps more or less di, tri, or titrathionate of ammonia and copper, all of which are very soluble. It will thus be seen that if powdered pyritous ore is placed in ammonia solution and then aerated in the usual way the action of ammonia on the metal, as is well known, will be accelerated; but if the surplus liquid be drained or filtered off as the liquid passes downward it will draw air after it, so that the free oxygen will enter the minute spaces between the particles of moist ore and the chemical action on the metal sulfids will be enormously increased both in speed and thoroughness of extraction. After the ammonia has spent its strength on the ore the whole may be leached with water to remove the metal solution. On rich ores the solution of ammonia should be made stronger before using than if it is to be used on an ore poorer in metal, and if the ore be extra strong in metal two, three, or even more alternate treatments of ammonia, air, and leaching may be found necessary. The ore moistened with ammonia solution can be slowly tumbled in the presence of air in large horizontal cylinders. When the ore is finely powered, the access of air to the ore after it has been moistened with ammonia can be hastened by use of a suction-pump connected with the drainpipe at the bottom of the ore-tank or by the application of air-pressure to the top of the wet ore at the same time that the solution is running off at the bottom. The dampened ore after the excess of the ammonia solution is withdrawn is in reality immersed under the simpler form of my process in the free oxygen of the atmosphere; but the spirit and intent of my invention would not be departed from were the crushed sulfid ore dampened with aqueous ammonia, exposed to the action of pure oxygen either in gaseous or liquid form, the essential feature being the exposure of the crushed sulfid ore while damp with aqueous ammonia, but not immersed therein, to the action of free oxygen, whereby a more intimate contact of the oxygen with the ore and ammonia is attained than heretofore. As a matter of fact, by my improved process practically all the spaces and interstices between the particles of damp ore are invaded by the oxygen, and in the chemical reactions which take place owing to the presence of the ammonia the maximum degree of reduction is attainable in the minimum of time.

What I claim as my invention, and desire to secure by Letters Patent, is—

1. The process herein set forth of rendering metallic sulfids soluble, consisting in drenching the crushed sulfid ore with aqueous ammonia, draining off the excess of aqueous ammonia, and exposing the ore thus moistened to the action of an excess of oxygen, whereby the oxygen is brought into intimate contact with the moist particles of crushed ore and the chemical action is accelerated, substantially as set forth.

2. The process herein set forth of rendering metallic sulfids soluble, consisting in drenching the crushed sulfid ore with aqueous ammonia, draining off the excess of aqueous ammonia, and exposing the ore thus moistened to the atmosphere, whereby the crushed ore and the ammonia absorbed and held thereby, are treated to an excess of oxygen, for the purpose of accelerating chemical action, substantially as set forth.

3. The process herein set forth of rendering metallic sulfids soluble, consisting in drenching the crushed sulfid ore with aqueous ammonia, draining off the excess of aqueous ammonia, treating the ore thus moistened to an excess of oxygen, leaching the ore, and repeating the operation until the metal is all extracted from the pulp, substantially as set forth.

CALEB G. COLLINS.

Witnesses:
D. W. GARDNER,
JOHN KIRN.